(12) United States Patent
Ashihara et al.

(10) Patent No.: US 9,964,139 B2
(45) Date of Patent: May 8, 2018

(54) SLIDING BEARING

(71) Applicant: TAIHO KOGYO Co., Ltd., Toyota-shi, Aichi (JP)

(72) Inventors: Katsuhiro Ashihara, Toyota (JP); Yuichiro Kajiki, Toyota (JP); Hiroki Takata, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 51 days.

(21) Appl. No.: 15/035,899

(22) PCT Filed: Nov. 7, 2014

(86) PCT No.: PCT/JP2014/079547
§ 371 (c)(1),
(2) Date: May 11, 2016

(87) PCT Pub. No.: WO2015/072401
PCT Pub. Date: May 21, 2015

(65) Prior Publication Data
US 2016/0298676 A1 Oct. 13, 2016

(30) Foreign Application Priority Data
Nov. 12, 2013 (JP) .................................. 2013-234244

(51) Int. Cl.
*F16C 33/10* (2006.01)
*F16C 9/02* (2006.01)
(Continued)

(52) U.S. Cl.
CPC .............. *F16C 9/02* (2013.01); *F16C 17/022* (2013.01); *F16C 33/046* (2013.01); *F16C 33/1065* (2013.01)

(58) Field of Classification Search
CPC ........ F16C 9/02; F16C 17/022; F16C 33/046; F16C 33/1065
See application file for complete search history.

(56) References Cited

U.S. PATENT DOCUMENTS 3,386,783 A * 6/1968 Scheufler ................ F16C 17/02
384/291
6,082,904 A 7/2000 Ono et al.
(Continued)

FOREIGN PATENT DOCUMENTS

DE 1576354 A1 * 4/1970 ............... F01M 1/06
JP 59004817 U1 1/1984
(Continued)

OTHER PUBLICATIONS

International Search Report corresponding to Application No. PCT/JP2014/079547; dated Feb. 10, 2015, with English translation.
(Continued)

*Primary Examiner* — Phillip A Johnson
(74) *Attorney, Agent, or Firm* — Cantor Colburn LLP

(57) ABSTRACT

Provided is a slide bearing 1 with which friction can be reduced and the total amount of effluent oil can be reduced. In the slide bearing in which halved members, made by dividing a cylinder in two in a direction parallel to the axial direction are disposed vertically, grooves are provided at an end of the axial direction of the lower halved member in the circumferential direction and the depth of the groove in the radial direction is changed corresponding to the circumstance direction and the gradient of the depth (d) of the groove in the radial direction is configured in asymmetry using the center (the bearing angle (ω) is (ω2)) in the circumferential direction as a symmetry axis.

2 Claims, 4 Drawing Sheets

(51) Int. Cl.
*F16C 17/02* (2006.01)
*F16C 33/04* (2006.01)

(56) References Cited

U.S. PATENT DOCUMENTS

| | | | |
|---|---|---|---|
| 6,695,482 B2 * | 2/2004 | Niwa | F16C 9/00 384/288 |
| 2004/0062458 A1 | 4/2004 | Mian et al. | |
| 2013/0182981 A1 | 7/2013 | Ishigo et al. | |

FOREIGN PATENT DOCUMENTS

| | | |
|---|---|---|
| JP | 2003532036 A | 10/2003 |
| JP | 2004340249 A | 12/2004 |
| JP | 2013148105 A | 8/2013 |

OTHER PUBLICATIONS

Extended European Search Report corresponding to Application No. 14861462.1-1751/3070353 PCT/JP2014079547; dated Mar. 20, 2017.

* cited by examiner

SLIDING BEARING

CROSS REFERENCE TO RELATED APPLICATIONS

This is the U.S. national stage of application No. PCT/JP2014/079547, filed on Nov. 7, 2014. Priority under 35 U.S.C. § 119(a) and 35 U.S.C. § 365(b) is claimed from Japanese Application No. 2013-234244, filed Nov. 12, 2013, the disclosure of which is also incorporated herein by reference.

TECHNICAL FIELD

The present invention relates to a slide bearing. In detail, the present invention relates to a slide bearing having vertically disposed halved members which are made by dividing a cylinder in two in a direction parallel to the axial direction.

BACKGROUND ART

Conventionally, a slide bearing for holding a crankshaft of an engine rotatably has halved structure in which two members divided in two are mated and is known. In order to reduce the frictional area of the bearing and to get friction-reducing effect, the width of the bearing is reduced. However, reducing the width of the bearing causes increase of volume of effluent oil. Then, it is publicly known that relief parts (grooves) all over the circumference are configured at the both ends of the bearing in the axial direction (Patent Literature 1).

PRIOR ART REFERENCE

Patent Literature

Patent Literature 1: the Japanese Translation of PCT International Application Publication No. JP 2003-532036 A

DISCLOSURE OF INVENTION

Problems to be Solved by the Invention

However, in the conventional bearing in which grooves all over the circumference are configured, reducing a friction area causes a decrease of the load carrying capacity and the oil film thickness which is necessary for good lubrication is not able to be kept and also the total volume of effluent oil is much.

In consideration of the above problems, the present invention provides a slide bearing for getting friction-reducing effect and to suppress total volume of effluent oil.

Means for Solving the Problems

Problems to be solved by the invention are described as above and the means for solving the problems is explained.

According to the invention of claim 1, in a slide bearing in which halved members made by dividing a cylinder in two in a direction parallel to the axial direction are disposed vertically, grooves are provided at an end of the axial direction of the lower halved member in the circumferential direction, the depth of the groove in the radial direction is changed corresponding to the circumstance direction and the gradient of the depth of the groove in the radial direction is configured in asymmetry using the center in the circumferential direction as a symmetry axis.

According to the invention of claim 2, the gradient of the depth of the groove in the radial direction is configured so that the gradient from the downstream end in the rotation direction to the point where the depth in the radial direction is maximum is smaller than the gradient from the upstream end in the rotation direction to the point where the depth in the radial direction is maximum.

Effect of the Invention

As effects of the invention, the effects shown as below are caused.

Namely, by providing the grooves which do not prevent the generation of the oil film pressure, the friction-reducing effect is obtained with reducing the frictional area and the total volume of effluent oil is reduced.

By changing the depth of the groove in the radial direction corresponding to the circumstance direction, the oil film pressure gradient is changed and the suck buck volume of the oil and the leak volume of the oil gradient can be changed.

By configuring the gradient of the depth so that the gradient of the depth at the downstream end is smaller than the gradient of the depth at the upstream end, the suck buck volume of the oil at the downstream end is decreased and the suck buck volume of the oil at the upstream end is increased. Thus, the total leak volume of the oil is decreased.

DETAILED DESCRIPTION OF THE INVENTION

Figure 1:
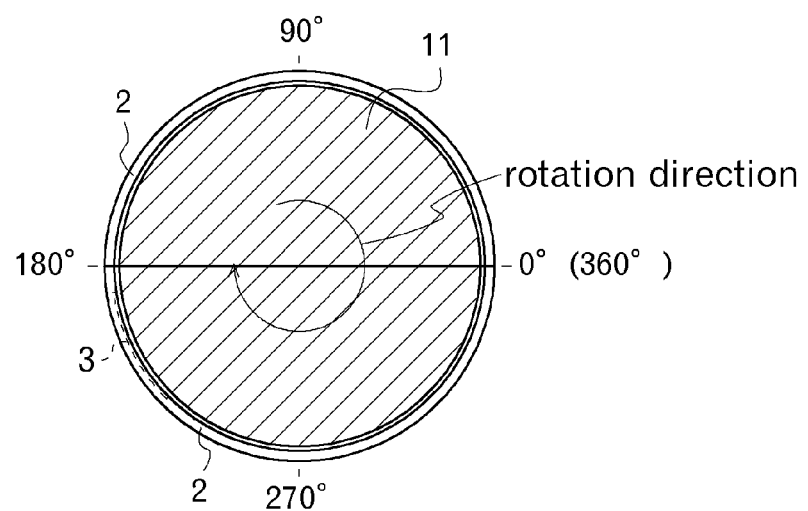
FIG. 1 is a front view of a slide bearing according to this embodiment.

An embodiment of the invention is explained. The FIG. 1 is the front view of the slide bearing 1 and the up and down direction on the drawing is defined as the up and down direction and the near and far direction on the drawing is defined as the axial direction (the front and back direction).

Firstly, the halved members 2 which configure the slide bearing 1 concerning the first embodiment are explained with the FIG. 1 and the FIG. 2.

The slide bearing 1 is cylindrical member and it is adopted to the slide bearing structure of the crankshaft 11 of the engine as shown in the FIG. 1. The slide bearing 1 is configured by the two halved members 2, 2. The halved members 2, 2 have the shapes in which the cylinder has been divided in two in the direction parallel to the axial direction and are shaped as semicircle shape on the cross-section view. In the embodiment, the halved members 2, 2 are disposed in the top and the bottom and the mating surfaces are shaped at the right and the left. In the case that the crankshaft 11 is held by the slide bearing 1, the clearance gap is configured and lubricating oil is supplied from oil route which is not shown toward the clearance gap.

Figure 2A:
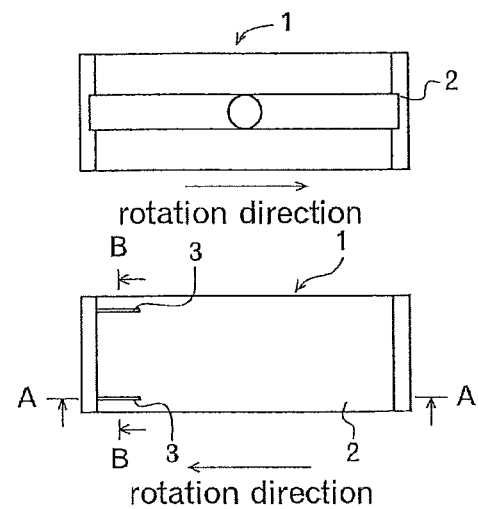
FIG. 2A is a plan view of a halved member of the slide bearing according to this embodiment.
Figure 2B:
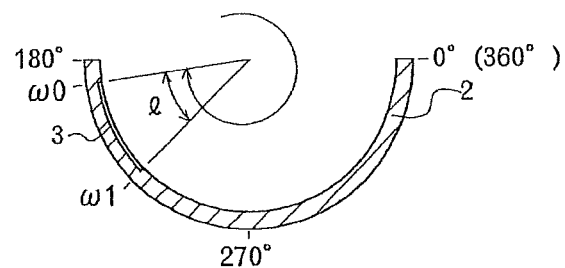
FIG. 2B is a A-A line sectional view.

In the FIG. 2A, upper and lower halved members 2 are shown. In the embodiment, the rotation direction of the crankshaft 11 is clockwise direction on the front view as the vector shown in the FIG. 1. In the bearing angle ω, the right edge in the FIG. 2B is defined as 0 degree and the counter clockwise direction shown in the FIG. 2B is positive direction. Thus, in the FIG. 2B, the bearing angle ω at the left edge is defined as 180 degrees and the bearing angle ω at the down edge is defined as 270 degrees.

A groove is provided in the circumferential direction at the inner circumference of the upper halved member 2 and the circle hole is provided at the center. The mating surfaces are disposed at the right and left side of the upper halved member 2.

In the slide surface of the inner circumference of the lower halved member 2, grooves 3 are configured at the edge in the axial direction.

The grooves 3 are provided at the lower halved member 2. In the embodiment, the grooves 3 are provided as two lines parallel in the direction of the axial direction. The downstream end 3a of the groove 3 in the rotation direction is provided to be adjacent to the mating surface on the downstream side of the rotation direction of the crankshaft 11 and not to be communicated with the mating surface on the downstream side of the rotation direction.

In detail, the downstream end 3a of the groove 3 in the rotation direction is disposed at the bearing angle ω0 which is bigger than 180 degrees where the mating surface on the downstream side of the rotation direction of the crankshaft 11 is located. Thus, the groove 3 is provided from the bearing angle ω which is bigger than the angle of the mating surface on the downstream side of the rotation direction of the crankshaft 11 (the bearing angle is 180 degrees) toward the direction in which the bearing angle ω is positive number (the counter clockwise direction) on the circumferential direction.

Thus, in the lower halved member 2, the mating surface on the right side in the FIG. 2B is the mating surface on the upstream side of the rotation direction and the mating surface on the left side in the FIG. 2B is the mating surface on the downstream side in the rotation direction.

The length l of the groove 3 is configured as the length from the downstream end 3a (the bearing angle ω is ω0) in the rotation direction to the upstream end 3b (the bearing angle ω is ω1) in the rotation direction. Furthermore, the bearing angle ω1 is more than ω0 and not more than 270 degrees. More detailed, the bearing angle oil is usually the range of 225 degrees to 270 degrees.

Figure 2C:
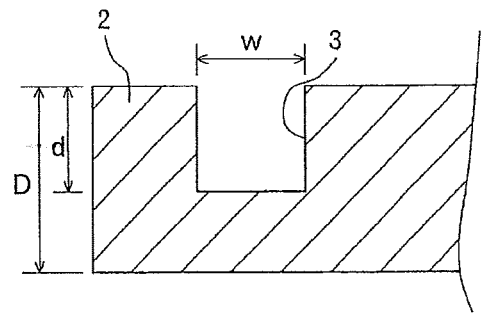
FIG. 2C is a B-B line sectional view.

As shown in the FIG. 2C, the groove 3 is configured as the depth d is shallower than the bearing thickness D. The width of the groove 3 is configured as w.

Figure 3A:
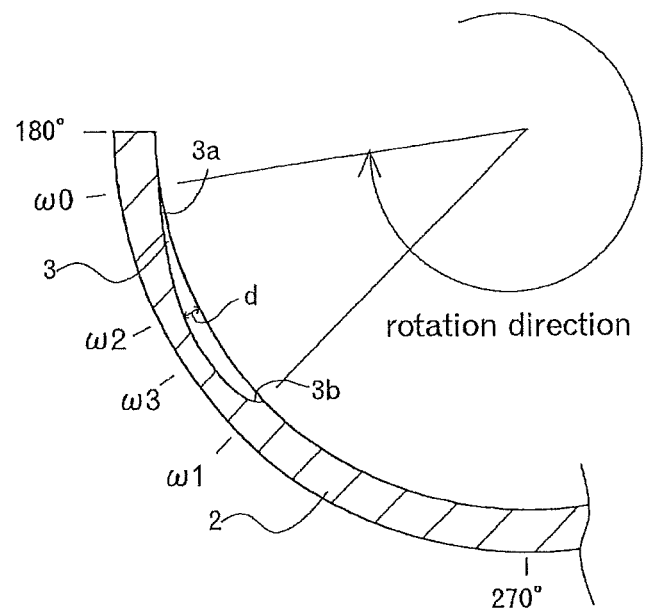
FIG. 3A is a A-A line sectional enlarged view according to this embodiment and FIG. 3B is a A-A line sectional enlarged view according to the compared example

As shown in the FIG. 3A, the depth d of the groove 3 changes in the circumferential direction. The gradient of the depth d of the groove 3 in the radial direction is configured in asymmetry using the center (the bearing angle ω is ω2) in the circumferential direction as a symmetry axis. Thus, at the sectional view, the point (the bearing angle ω is ω3) where the depth d in the radial direction is maximum is located more upstream side in the rotation direction than the center of the groove 3 (the bearing angle ω is ω2) in the circumferential direction.

Figure 3B:
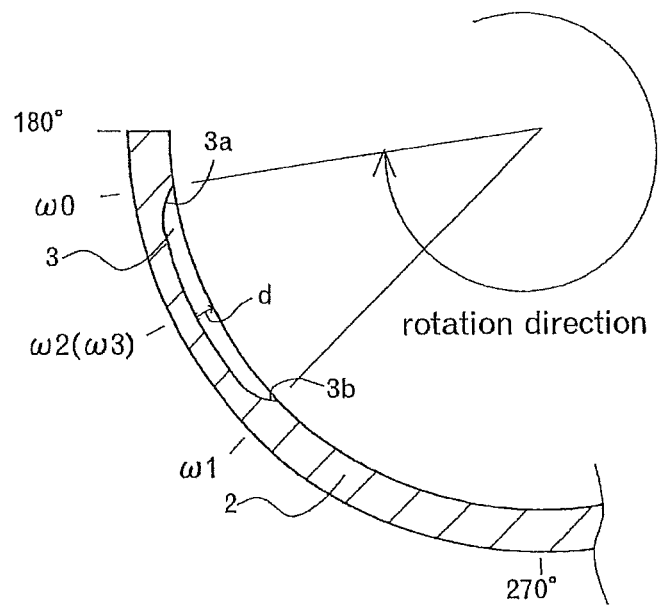

As shown in the FIG. 3B as the compared example, the gradient of the depth d of the groove 3 in the radial direction is configured in symmetry using the center in the circumferential direction as a symmetry axis. For reducing the total leak volume of the oil, it is necessary that the suck back volume of the oil is increased and the leak volume is decreased. In the structure shown in the FIG. 3B, the suck back volume of the oil at the upstream end 3b in the rotation direction is increased and the leak volume of the oil at the upstream end 3b in the rotation direction is also increased.

Thus, as shown in the FIG. 3A, by configuring the gradient of the depth d of the groove 3 in the radial direction in asymmetry using the center (the bearing angle ω is ω2) in the circumferential direction as a symmetry axis and by configuring that the gradient from the downstream end 3a (the bearing angle ω is ω0) in the rotation direction to the point (the bearing angle ω is ω3) where the depth in the radial direction is maximum is smaller than the gradient from the upstream end 3b (the bearing angle ω is ω1) in the rotation direction to the point (the bearing angle ω is ω3) where the depth in the radial direction is maximum, the suck buck volume of the oil at the upstream end 3b is increased and the leak volume of the oil at the downstream end 3a is decreased.

Figure 4:
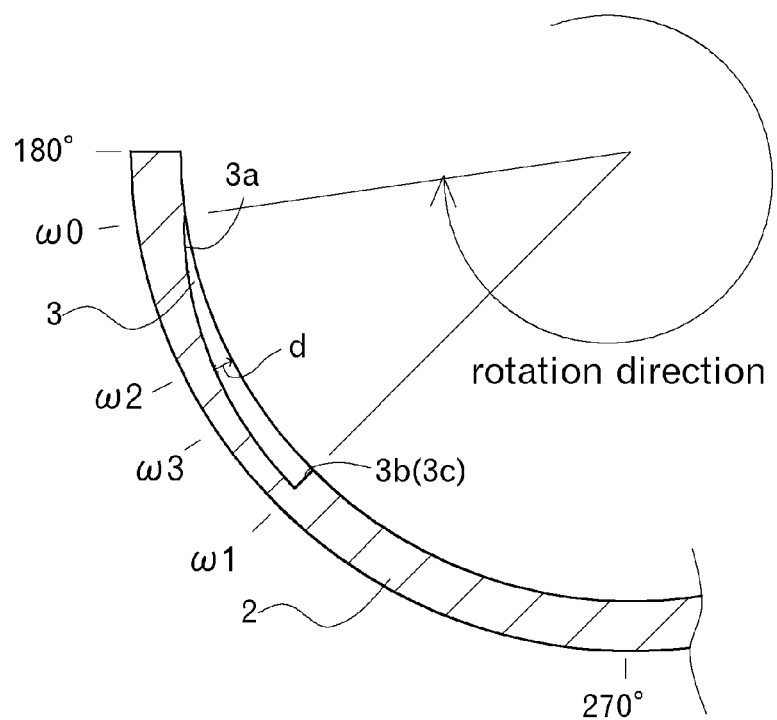
FIG. 4 is a A-A line sectional enlarged view according to this embodiment

Furthermore, according to this embodiment, the bottom surface of the groove 3 is the continuous curve in the sectional view. It is not limited and for example, as shown in FIG. 4, at the upstream end 3b (the bearing angle ω is ω1) in the rotation direction, the incline of the bottom surface is not continuous and the side wall 3c which is extended to the radial direction is provided between the inner surface and the bottom surface of the slide bearing 1.

As stated above, the slide bearing 1 in which halved members 2, 2 made by dividing a cylinder in two in a direction parallel to the axial direction are disposed vertically, grooves 3 are provided at an end of the axial direction of the lower halved member 2 in the circumferential direction and the depth d of the groove 3 in the radial direction is changed corresponding to the circumstance direction and the gradient of the depth d of the groove 3 in the radial direction is configured in asymmetry using the center (the bearing angle ω is ω2) in the circumferential direction as a symmetry axis.

This structure, by changing the depth d of the groove 3 in the radial direction corresponding to the circumstance direction, changes the oil film pressure gradient and the suck buck volume of the oil and the leak volume of the oil gradient. Thus, by producing the difference between the suck back volume of oil and the leak volume of the oil at the more upstream side than the center (the bearing angle ω is ω2) in the circumferential direction and the suck back volume of oil and the leak volume of the oil at the more downstream side than the center (the bearing angle ω is ω2) in the circumferential direction, the oil film pressure gradient is changed and the suck buck volume of the oil and the leak volume of the oil gradient can be changed.

The gradient of the depth d of the groove 3 in the radial direction is configured so that the gradient from the downstream end 3a in the rotation direction to the point (the bearing angle ω is ω3) where the depth in the radial direction is maximum is smaller than the gradient from the upstream end 3b in the rotation direction to the point (the bearing angle ω is ω3) where the depth in the radial direction is maximum By this structure, by configuring the gradient of the depth d of the groove 3 so that the gradient at the downstream end 3a is gentler than the gradient at the upstream end 3b, the suck buck volume of the oil at the downstream end 3a is decreased and the suck buck volume of the oil at the upstream end 3b is increased. Thus, the total leak volume of the oil is decreased.

INDUSTRIAL APPLICABILITY

The present invention is acceptable to the skill of the slide bearing and acceptable to the slide bearing having vertically disposed halved members which are made by dividing a cylinder in two in a direction parallel to the axial direction.

DESCRIPTION OF NOTATIONS 1 slide bearing
2 halved member
3 groove
3a downstream end
3b upstream end
11 crankshaft

The invention claimed is:

1. A slide bearing in which halved members made by dividing a cylinder in two in a direction parallel to an axial direction are disposed vertically,
    wherein grooves are provided at an end of the axial direction of the lower halved member,
    wherein a depth of each groove in the radial direction is changed corresponding to a rotation direction and a gradient of the depth of each groove in the radial direction is configured in asymmetry using a center of each groove in the rotation direction as a symmetry axis,
    and wherein the gradient of each depth of each groove in the radial direction is configured so that the gradient from the downstream end in the rotation direction to the point where the depth in the radial direction is maximum is smaller than the gradient from the upstream end in the rotation direction to the point where the depth in the radial direction is maximum.

2. The slide bearing according to claim 1 wherein the downstream end of the rotation direction of each groove is disposed at a first bearing angle,
    wherein the first bearing angle is bigger than an angle in which the mating surface on the downstream side of the rotation direction is located,
    wherein the upstream end of the rotation direction of each groove is disposed at a second bearing angle,
    and wherein the second bearing angle is bigger than the first bearing angle and not more than the angle which is rotated 90 degrees from the angle in which the mating surface on the downstream side of the rotation direction is located.

* * * * *